United States Patent [19]

Igarashi et al.

[11] Patent Number: 4,793,072
[45] Date of Patent: Dec. 27, 1988

[54] DEHYDRATION METHOD AND DEHYDRATION SYSTEM

[75] Inventors: Shiro Igarashi, Fuchu; Mamoru Matsubara, Tokyo; Shiro Tanaka, Atsugi, all of Japan

[73] Assignees: Kewpie Kabushiki Kaisha; Showa Denko Kabushiki Kaisha; San-Ei Shokuhin Hanbai Kabushiki Kaisha, all of Tokyo, Japan

[21] Appl. No.: 71,622

[22] Filed: Jul. 9, 1987

[30] Foreign Application Priority Data

Jul. 22, 1986 [JP] Japan .................. 61-170944

[51] Int. Cl.⁴ .............................................. F26B 3/00
[52] U.S. Cl. .......................................... 34/9; 426/426; 426/442
[58] Field of Search ........................ 34/9; 426/443, 442, 426/474, 455, 465, 640, 426, 693; 210/195.2

[56] References Cited

U.S. PATENT DOCUMENTS

| | | | |
|---|---|---|---|
| 2,420,517 | 5/1947 | Brandnes et al. | 426/426 X |
| 3,801,714 | 4/1974 | Shipman et al. | 426/455 X |
| 3,904,774 | 9/1975 | Dymsza | 426/426 X |
| 3,978,235 | 8/1976 | Schiro | 426/455 X |
| 4,206,242 | 6/1980 | Freytag et al. | 426/442 X |
| 4,209,911 | 7/1980 | Weber | 34/9 |
| 4,383,376 | 8/1983 | Numamoto et al. | 34/9 |
| 4,447,460 | 5/1984 | Lewis et al. | 426/640 X |
| 4,551,348 | 11/1985 | O'Mahony et al. | 426/442 X |
| 4,662,990 | 5/1987 | Bonanno | 34/9 X |

FOREIGN PATENT DOCUMENTS 58124  9/1981 Japan .
187759 10/1984 Japan .

*Primary Examiner*—Steven E. Warner
*Attorney, Agent, or Firm*—Rosen, Dainow & Jacobs

[57] ABSTRACT

A material to be dehydrated wrapped in a semipermeable sheet is dipped in a dehydrating solution to cause part of water contained in the material to be absorbed into the dehydrating solution to dehydrate the material, and the water-absorbed dehydrating solution is cooled and concentrated to adjust its temperaure and concentration, and sterilized as needed, to be used repeatedly for the dehydration treatment, thereby dehydrating a large amount of material to be treated without changing the quality of the material under consistent conditions with enhanced economy and efficiency.

24 Claims, 2 Drawing Sheets

DEHYDRATION METHOD AND DEHYDRATION SYSTEM

BACKGROUND OF THE INVENTION

This invention relates to a dehydration method for efficiently removing water contained in foods such as fish, meat, vegetables, fruits, crops, and processed products thereof and to a dehydration system to be used therefor, and more specifically to a dehydration method that can remove water from a large amount of materials continuously.

Water contained in foods such as fish, meat, vegetables, fruits, and processed products thereof (hereinafter simply referred to as "foods") may be a cause of deterioration in the quality of foods deteriorated freshness, freezing damage, occurrence of dripping at thawing. Therefore, a variety of methods have been proposed for removing water contained in foods.

For example, Japanese Patent Publication No. 58124/1983 and U.S. Pat. No. 4,383,376 disclose a method in which foods are wrapped in a special sheet material based on a combination of a high-osmotic-pressure material and a semipermeable membrane to remove water therefrom. However, the method has been defective in that it requires a substantial cost and time for the manufacture of the special sheet material, the foods must be individually wrapped in the sheet material and the individual food packages are separately subjected to dehydration. Accordingly this method results in extremely low efficiency, and it is not adaptable for automation.

Japanese Patent Application (Laid-open No. 187759/1984) describes a method in which foods, which are sliced as needed, are dipped in a dehydrating solution comprising a sugar solution alone or its mixture to absorb water contained in the foods into the dehydrating solution, using a difference in osmotic pressure between the dehydrating solution and foods. However, this method has a problem in that the dehydrating solution containing sugar and other substances may permeate the foods, which can result in a change in the original taste and flavor of the foods. Further, since as the dehydrating solution absorbs water from the foods, its concentration varies with time, it is difficult to treat a large amount of foods with the same dehydrating solution for an extended period of time.

SUMMARY OF THE INVENTION

With a view to obviate all of the conventional art defects of dehydration methods for removing water from foods, it is a primary object of the present invention to provide a dehydration method for efficiently removing water from materials without changing the quality of the materials, which is suitable for treating a large amount of materials, and a system to be used therefor.

In accordance with the present invention which attains the above object, there is provided a dehydration method for removing water from materials to be treated in which a material to be treated is wrapped in a semipermeable sheet and dipped in a dehydrating solution to remove part of the water contained in the material. The dehydrating solution which is used for the dehydration is cooled and concentrated to adjust the temperature and concentration, sterilized as needed, and reused for the dehydration. There is also provided according to the present invention a dehydration system comprising a dipping tank filled with the dehydrating solution for dipping the material to be treated, cooling means for cooling the dehydrating solution to adjust its temperature, and concentrating means for concentrating the dehydrating solution to adjust its concentration. Another embodiment of the dehydration system according to the present invention comprises a dipping tank filled with the dehydrating solution for dipping the material to be treated, cooling means for cooling the dehydrating solution to adjust its temperature, concentrating means for concentrating the dehydrating solution to adjust its concentration, and sterilizing means for sterilizing the dehydrating solution.

With the present invention, a large amount of foods can be dehydrated economically with a high efficiency without changing the quality of the foods to be treated under consistent dehydrating conditions.

DETAILED DESCRIPTION OF THE INVENTION

Figure 1:
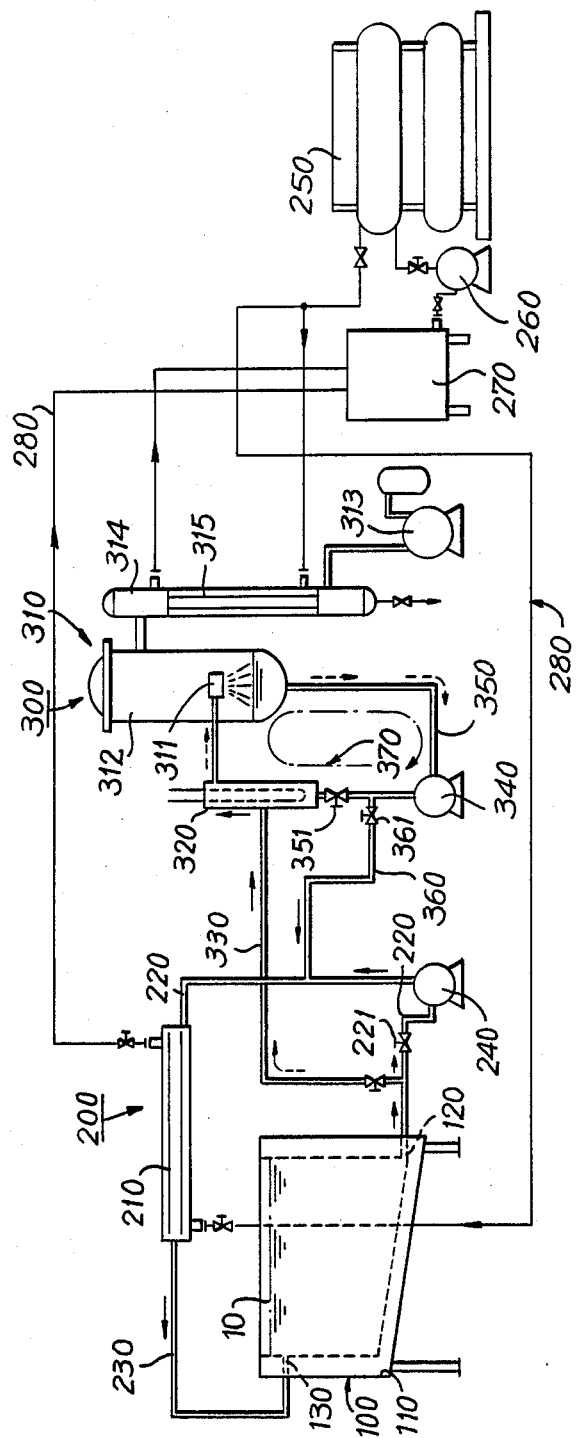
FIG. 1 is a schematic view showing the structure of a first embodiment of the dehydration system for foods according to the present invention.

Materials to be treated in the present invention include mainly, but are not restricted to, raw fish, perishable foods of animal nature such as animal meat, vegetable foods such as raw vegetables and fruits, half-cooked or heat-treated foods from the above materials, which by removing water therefrom are improved in terms of preservability, resistance to freezing, tastes, or cooking adaptability.

The semipermeable sheets used in the present invention include, for example, Vinylon film, normal cellophane, low-elongation polyamide film, ethylene-vinyl acetate copolymer film, and collodion film, which allow water and molecules with almost the same size as water molecules to pass, but do not pass polymer materials, and are harmless to food contacted by the sheets.

The dehydrating solution is a liquid having an enhanced dehydrating property, such as a concentrated water solution of one or more substances selected from the group consisting of malt syrup, cane sugar, glucose, isomerized sugar, fructose, and oligosaccharide, or a solution of propylene glycol or the like, of which the solute does not substantially pass through the semipermeable sheet, and is approved to be used as a food, a food chemical, or a food processing material. It is preferable that the concentrated sugar solution has a concentration of 40 weight % or more in view of the dehydration capability, with an upper limit of 55–60 weight % in view of the solubility capability.

When the dehydration method according to the present invention is carried out, the foods to be treated must be wrapped in the semipermeable sheet using a packing machine. In this case, it is desirable to pack the foods by vacuum packing in order to assure close contact of the semipermeable sheet with the foods to be treated for enhanced dehydration efficiency.

When the foods to be treated which are thus packed in the semipermeable sheet are immersed in the dehydrating solution, the foods to be treated contact the dehydrating solution through the semipermeable sheet.

This causes water contained in the foods to permeate the semipermeable sheet and pass into the dehydrating solution by the function of an osmotic pressure and to be absorbed by the dehydrating solution, thereby dehydrating the foods.

During the dehydration process, the temperature of the dehydrating solution will increase which may deteriorate the quality of the foods to be treated, and the concentration of the dehydrating solution will decrease which results in reduced dehydration efficiency. To eliminate these problems, in the present invention the dehydrating solution having an elevated temperature is cooled to be used repeatedly, and the diluted dehydrating solution is concentrated so that the dehydrating solution with almost a constant concentration is used to dehydrate the foods to be treated, thereby ensuring a constant rate of dehydration.

When the dehydrating solution is used continuously or repeatedly, there may be an admixture and propagation of bacteria. Therefore, the dehydrating solution is sterilized as needed to prevent propagation of microbes.

Since in the dehydration method according to the present invention, the foods to be treated packed in the semipermeable sheet come in contact with the dehydrating solution through the semipermeable sheet, the quality of the foods will not change during the dehydration process. Furthermore, since the temperature of the dehydrating solution used in the dehydration process is controlled to an adequate value, the quality such as freshness of the foods being treated will not deteriorate and the propagation of bacteria in the dehydrating solution will be restricted.

Moreover, the concentration of the dehydrating solution is adjusted to allow it to be used continuously or repeatedly for an extended period of time, thereby maintaining a constant rate of dehydration for the foods to be treated. Furthermore, when the dehydrating solution is liable to be contaminated with bacteria, the dehydrating solution can be sterilized as needed to allow it to be used continuously or repeatedly for an extended period of time, without any deterioration in quality of the foods to be treated.

Preferred embodiments of the dehydration system for use in the dehydration method according to the present invention will now be described. FIG. 1 shows a first embodiment of the dehydration system for foods according to the present invention. Referring to FIG. 1, the dehydration system comprises a dipping tank 100 filled with a dehydrating solution 10 into which foods to be treated are immersed, cooling means 200 for circulating and cooling to adjust the temperature of the dehydrating solution 10, and concentrating means 300 for concentrating and removing excess water from the dehydrating solution 10 which is diluted with water absorbed from the foods to be treated.

The dipping tank 100 has an internal capacity allowing it to contain a large amount of the foods to be treated when placed in it with the dehydrating solution 10. Since the dehydrating solution 10 is circulated and cooled by the cooling means 200, the dipping tank 100 has a heat-insulated structure with a heat-insulating material layer 110 disposed on the inner wall surface.

The cooling means 200 has a cooler 210 as a main part of the cooling device, and cooling/circulating means for circulating the dehydrating solution through the cooler 210. The cooling/circulating means has a first pipe 220 connecting an outlet port 120 disposed beneath the dipping tank 100 and the cooler 210, a second pipe connecting the cooler 210 and an inlet port 130 disposed above the dipping tank 100, and a first pump 240 disposed midway in the first pipe 220. The first pump 240 is operated to circulate the dehydrating solution 10 from the dipping tank 100 through the first pipe 220, the cooler 210 and the second pipe 230 to the dipping tank 100. The first pipe 220 at the upstream of the first pump 240 is provided with a valve 221 which adjusts the flow rate of the dehydrating solution 10 circulated by the cooling/circulating means. The cooler 210, with a brine chiller 250, a pump 260, a brine tank 270, and a brine circulation passage 280 connecting these components, constitutes the cooling device, which is circulated with chilled brine to cool the dehydrating solution 10 passing through the insides of the cooler 210.

The concentrating means 300 comprises a concentrating device disposed outside the dipping tank 100 and concentrating/circulating means for circulating the dehydrating solution 10 through the concentrating device. The concentrating means of this embodiment has a vacuum concentrating device 310 and a heating device 320 disposed upstream of the vacuum concentrating device 310. The circulating means has a third pipe 330 which branches off the first pipe 220 of the cooling/circulating means and is connected to a heating device 320, a fourth pipe 350 to return the dehydrating solution concentrated in the vacuum concentrating device 310 to the heating device 320 through a second pump 340, and a fifth pipe 360 which branches off the fourth pipe 350 and is connected to the first pipe 220. The dehydrating solution 10 in the dipping tank 100 is circulated through the first pipe 220, a valve 331, the third pipe 330, and the heating device 320 to the vacuum concentrating device 310 to be concentrated, and then circulated by the second pump 340 through the fourth pipe 350, the fifth pipe 360, the first pipe 220, the cooler 210, and the second pipe 230 to the dipping tank 100.

In this embodiment, as needed, the concentrated dehydrating solution can be repeatedly concentrated by circulating it through a partial circulation passage 370 formed by circulating it from the vacuum concentrating device 310, through the fourth pipe 350 and the heating device 320, to the vacuum concentrating device 310. The flow of the dehydrating solution 10 through the circulation passage is controlled and switched by the valve 331 provided at the branch of the third pipe 330, a valve 351 provided at the connection of the fourth pipe 350 and the heating device 320, and a valve 361 provided at the branch of the fifth pipe 360 off the fourth pipe 350.

The vacuum concentrating device 310 itself can be of a conventional type known in the art which, in this embodiment, has a flash chamber 312 having a spray nozzle 311 to spray the dehydrating solution heated in the heating device 320, a vacuum pump 313 to evacuate the flash chamber 312, a mist separator 314 disposed between the vacuum pump 313 and the flash chamber 312, and a cooler 315 to cool the mist separator 314. The cooler 315 is supplied with part of the chilled brine by the brine chiller 250.

For enhanced concentration efficiency of the vacuum concentrating device 310, this embodiment uses an electric heater as the heating device 320 which preheats the dehydrating solution to be sprayed in the flash chamber 312. However, alternatively, a heat exchanger can be used as the heating device 320, or the heating device 320 may be omitted and the flash chamber 312 can be heated by a hot-water jacket instead.

Dehydrating operation using this embodiment of the dehydration system will now be described. The dipping tank 100 is filled with the dehydrating solution 10 as described above, in which are dipped foods to be treated wrapped in the semipermeable sheet. Water contained in the foods permeates the semipermeable sheet into the dehydrating solution 10, thereby dehydrating the foods. In this case, a number of packages of the foods to be treated, put in a cage, can be dipped into the dehydrating solution 10 in the dipping tank 100 manually or by using a crane. Dipping time for the dehydration treatment is adequately determined in accordance with various conditions such as type, shape, and processing of the foods, or type and concentration of the dehydrating solution. With these conditions set to predetermined values, a constant rate of dehydration for the foods to be treated can always be obtained by setting the dipping time to a fixed period. Thus, a timer or the like can be set and, when the set time is reached, the crane can be operated to remove the treated foods from the dipping tank 100. During the dehydration treatment of the foods, water contained in the foods is transferred into the dehydrating solution 10 to reduce its concentration, but due to the function of the concentrating means 300, the concentration of the dehydrating solution 10 can be maintained at a predetermined value throughout the treatment.

Since in most cases the foods to be treated are perishable foods and keeping the freshness of the foods is an important factor, the dehydration treatment is preferably carried out in the dehydrating solution at low temperatures (for example 0 to 5 degrees C.). In this case, the temperature of the dehydrating solution 10 is increased during the treatment with heat from the foods being treated and room temperature, and further increased during the circulation through the concentrating means 300. Depending on the type of the dehydrating solution 10, when cane sugar or isomerized sugar, for example, is used, an exothermic reaction takes place to generate dissolution heat when these sugars are dissolved in water. Therefore, in order to keep the freshness of the foods to be treated and prevent propagation of bacteria in the dehydrating solution, it is necessary to keep the dehydrating solution 10 which contacts the foods to be treated at a low temperature by means of the cooling means 200.

In this embodiment, to cause the cooling means 200 to function, the first valve 221 is opened and the first pump 240 is operated to circulate the dehydrating solution 10 in the dipping tank 100 through the outlet port 120, the first pipe 220, the cooler 210, the second pipe 230, and the inlet port 130. Since, in this case, the cooler 210 is supplied with chilled brine from the brine chiller 250, the dehydrating solution is cooled.

To cause the concentrating means 300 to function, first the valve 331 is opened to feed the dehydrating solution to the heating device 320. The dehydrating solution at a low temperature (for example 0 to 5 degrees C.) is heated by the heating device 320 at 15 to 60 degrees C., and then fed to the vacuum concentrating device 310. In the vacuum concentrating device 310, the heated dehydrating solution is sprayed from the spray nozzle 311 in the flash chamber 312, and, at the same time, the flash chamber 312 is evacuated by the vacuum pump 313 to a high degree of vacuum to remove part of the water in the dehydrating solution. The water (vapor) thus removed passes through the mist separator 314, is cooled by the cooler 315 to condense, and is discharged as drain water. When the valve 351 is closed and the valve 361 is opened, the concentrated dehydrating solution is returned through the fourth pipe 350 and the fifth pipe 360 to the first pipe 220 by the function of the second pump 340, and sent through the cooler 210 and the second pipe 230 to the dipping tank 100.

With the concentrating means 300 of this embodiment, if the concentration is insufficient by a single concentration step as described above, the valve 361 which is normally open can be closed and the normally-closed valve 351 can be opened to form the partial circulation passage 370 for repeated concentration. Thus, the once concentrated dehydrating solution can be circulated through the heating device 320 to the vacuum concentrating device 310 to undergo a plurality of concentrating steps. The thus sufficiently concentrated dehydrating solution in the partial circulation passage 370 can be fed, by operating the valves 351 and 361, through the cooler 210 to the dipping tank 100. The procedure can be adequately repeated to increase the concentration of the dehydrating solution 10 in the dipping tank 100 in a relatively shorter time as compared to the use of normal circulation for concentration, this procedure being extremely effective in controlling the concentration of the dehydrating solution 10.

With the system of this embodiment, the valves 221, 331, 351 and 361 can be adequately opened and closed or can be partially opened with adequate adjustment to control the flow path of the dehydrating solution in the cooling means 200 and concentrating means 300. Thus, the valves 221, 331, 351, and 361 can be operated manually or electrically to vary the flow rate of the dehydrating solution to the cooling means 200 and the concentrating means 300 or to vary the degree of concentration thereof, thereby controlling the temperature and concentration of the dehydrating solution 10 in the dipping tank 100. In this case, the properties of the dehydrating solution 10 can be checked or detected (for concentration and temperature) manually or by a detecting device in the dipping tank 100 or in the vicinity of the outlet port 120 of the dipping tank 100, and depending upon the detected values, the corresponding valves can be operated manually, or automatically using the signals from the detecting device.

A second embodiment of the dehydration system according to the present invention will now be described. In the above-described first embodiment of the dehydration system, the dehydrating solution 10 in the dipping tank 100 is kept at a low temperature due to the function of the cooling means 200. However, if the same dehydrating solution is used repeatedly for an extended period of time, there may be an admixture of bacteria and mold. To prevent such propagation of bacterial and mold, the second embodiment of the dehydration system is provided with sterilizing means.

Figure 2:
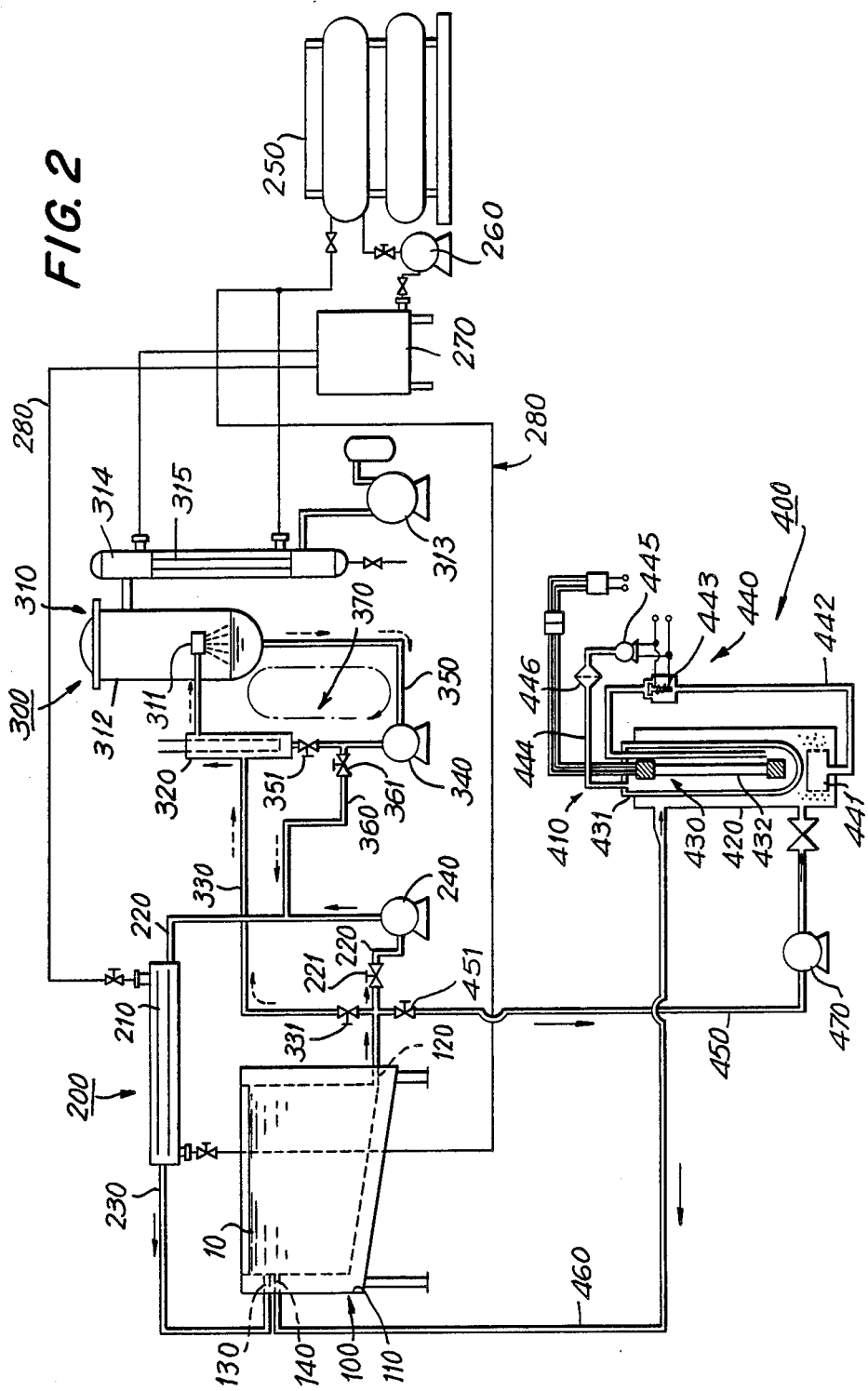
FIG. 2 is a schematic view showing the structure of a second embodiment of the dehydration system for foods according to the present invention.

FIG. 2 is a schematic view of the second embodiment of the dehydration system according to the present invention. In the figure, the same parts and components as used in the first embodiment are identified using the same numerals, and the descriptions are omitted.

Referring to FIG. 2, sterilizing means 400 comprises a sterilizing device 410 provided outside the dipping tank 100 and circulating means for circulating the dehydrating solution 10 through the sterilizing device 410. The sterilizing device 410 has a sterilizing cylinder 420 which is supplied with the dehydrating solution 10, an ultraviolet ray irradiating device 430 inserted in the sterilizing cylinder 420 for irradiating the dehydrating solution 10 with ultraviolet rays, and an ozone supplying device 440 for supplying ozone to the dehydrating solution in the sterilizing cylinder 420. The circulating means for circulating the dehydrating solution through the sterilizing cylinder 420 of the sterilizing device 410 is provided with a sixth pipe 450 which branches off the first pipe 220 and is connected to a lower part of the sterilizing cylinder 420, a seventh pipe 460 which connects an upper part of the sterilizing cylinder 420 and a second inlet port 140 of the dipping tank 100, and a third pump 470 disposed in the sixth pipe 450. A valve 451 is disposed at the connection of the sixth pipe to the first pipe 220, thereby adjusting the amount of the dehydrating solution supplied to the sterilizing cylinder 420.

With such an arrangement of the sterilizing means 400, the dehydrating solution supplied to the sterilizing cylinder 420 by the third pump 470 is sterilized by the ultraviolet irradiation and with ozone, and then fed to the dipping tank 100 through the seventh pipe 460. The individual devices will now be described in detail.

The ultraviolet ray irradiating device 430 sterilizes the dehydrating solution in the sterilizing cylinder 420 with ultraviolet rays radiated by an ultraviolet lamp 432 disposed within an irradiating cylinder 431 which is located inside the sterilizing cylinder 420. Furthermore, ozone generated in the irradiating cylinder 431 is supplied into the dehydrating solution in the sterilizing cylinder 420 by means of the ozone supplying device 440.

The ozone supplying device 440 has a supply port 441 disposed at the inner lower part of the sterilizing cylinder 420, a pipe 442 disposed from the supply port 441 to the inner lower part of the irradiating cylinder 431, an electromagnetic valve 443 disposed in the pipe 442, an air pump 445 connected to the upper part of irradiating cylinder 431 through a pipe 444, and an air filter 446 disposed in the pipe 444. The air pump 445 and the electromagnetic valve 443 operate in synchronization with each other, so that the electromagnetic valve 443 is opened when the air pump 445 is operated. Thus, when the air pump 445 is operated, air passed through the air filter 446 is supplied to the inside of the cylinder 431, and ozone generated in the cylinder 431 is blown into the dehydrating solution in the sterilizing cylinder 420 from the supply port 441 through the pipe 442.

Since, in the second embodiment of the dehydration system according to the present invention, the dipping tank 100 containing the dehydrating solution 10 to remove water in the foods to be treated, is connected with the sterilizing means 400 having the ultraviolet ray irradiating device 430 and the ozone supplying device 440, bacteria and mold coming from the foods under dehydration and air into the dehydrating solution are rapidly and positively sterilized with ultraviolet rays and ozone, thereby preventing their propagation in the dehydrating solution during the dehydration process, even if the system is stopped for a long time during holidays or nights. Further, since the dehydrating solution is sterilized without heating, no discoloration occurs and therefore the dehydrating solution can be repeatedly used over an extended period of time, thereby providing much improved economy. The sterilizing means 400 used in this embodiment can effectively be connected alone to the dipping tank 100.

As indicated below, various materials were continuously treatd using the second embodiment of the dehydration system according to the present invention. The resulting average dehydration rates are shown in Tables 1 to 3. In this case, approximately 1,200 liters of a 40-45% isomerized sugar water solution was used as the dehydrating solution, and approximately 400 kg of each material to be treated was wrapped in a Vinylon film of 30 microns in thickness and dipped in the dehydrating solution for a specified period of time. During the dipping, the dehydrating solution was adjusted to maintain a temperature not exceeding 5 degrees C and a concentration of 40 to 45% by means of the cooling means and the concentrating means.

As shown in Tables 1 to 3, with the same dipping time, the individual materials to be treated were dehydrated to nearly constant dehydration rates. This is because the dehydrating solution was continuously concentrated by means of the concentrating means, which indicates that the dehydration system according to the present invention can yield a large amount of dehydrated materials with nearly constant dehydration rates.

Since, with the same dipping time, the dehydration rate varies with the type of material to be treated, prior testing is required to determine the dipping time to obtain a desired dehydration rate.

TABLE 1

| Time (hour) | Dehydration rate (%) | | | | |
|---|---|---|---|---|---|
| | 1 | 2 | 3 | 4 | 5 |
| Carrot strips | 7.38 ± 0.25 | 12.5 ± 0.41 | 16.1 ± 0.48 | 19.2 ± 0.58 | 20.2 ± 1.04 |
| Cabbage strips | 4.38 ± 0.25 | 7.13 ± 0.48 | 8.63 ± 0.48 | 10.9 ± 0.63 | 12.8 ± 1.19 |
| Cabbage chips | 2.67 ± 0.54 | 4.00 ± 0.67 | 5.33 ± 0.54 | 6.19 ± 0.32 | 6.84 ± 1.38 |
| Lettuce chips | 4.63 ± 0.25 | 6.38 ± 0.48 | 6.75 ± 0.65 | 7.75 ± 0.29 | 8.50 ± 1.00 |

Carrot strips; 3-5 mm square, 30-60 mm in length
Cabbage strips: 3-5 mm in width
Cabbage chips, Lettuce chips: about 20 mm square

TABLE 2

| Time (hour) | Dehydration rate (%) | | | | |
|---|---|---|---|---|---|
| | 0.5 | 1.0 | 1.5 | 2.0 | 2.5 |
| Onion dice | 3.30 ± 0.27 | 4.10 ± 0.42 | 5.60 ± 0.22 | 6.75 ± 0.50 | 7.70 ± 0.29 |

Onion dice: 5-10 mm cube

TABLE 3

| Time (hour) | Dehydration rate (%) | | | |
|---|---|---|---|---|
| | 1 | 2 | 3 | 4 |
| Frozen chicken white meat | 2.65 ± 0.20 | 4.85 ± 0.35 | 6.95 ± 0.35 | — |
| Frozen chicken dark meat | — | 3.62 ± 0.29 | 4.15 ± 0.50 | 5.60 ± 0.86 |
| Frozen chicken chest meat | — | 3.52 ± 0.52 | 4.08 ± 0.16 | 5.57 ± 0.30 |
| Frozen chicken leg meat (*) | — | — | 2.60 ± 0.42 | 3.70 ± 0.50 |
| Frozen duck dark meat | — | 3.58 ± 0.40 | 4.22 ± 0.45 | 5.13 ± 0.27 |

Each material sliced into 10-15 mm in thickness, about 100 mm in length, and 40-50 mm in width
(*) Samples after dipping in a condiment were tested.

We claim:

1. A dehydration method for removing water from materials, comprising dipping a material to be treated wrapped in a semipermeable sheet into a dehydrating solution to absorb part of the water contained in said material, cooling and concentrating said dehydrating solution to adjust temperature and concentration of said dehydrating solution, and sterilizing said dehydrating solution as needed for reuse in dehydration.

2. A dehydration method for removing water from materials as claimed in claim 1, wherein said dehydrating solution adjusted of its temperature and concentration, and sterilized as needed, is continuously used to continuously treat a large amount of said material to be treated.

3. A dehydration method for removing water from materials as claimed in claim 1, comprising the further step of sterilizing said dehydration solution as needed, and reusing said sterilized solution to continuously treat a large amount of said material to be treated.

4. A dehydration system for removing water from materials, comprising a dipping tank filled with a dehydrating solution for dipping a material to be treated, cooling means for cooling said dehydrating solution to adjust its temperature, and concentrating means for concentrating said dehydrating solution to adjust its concentration.

5. A dehydration system for removing water from materials as claimed in claim 4, wherein said cooling means includes a cooling device provided outside said dipping tank and circulating means for circulating said dehydrating solution from said dipping tank through said cooling device and back to said dipping tank.

6. A dehydration system for removing water from materials as claimed in claim 4, wherein said concentrating means includes a concentrating device provided outside said dipping tank and a circulating means for circulating said dehydrating solution from said dipping tank through said concentrating device and back to said dipping tank.

7. A dehydration system for removing water from materials as claimed in claim 4, wherein said dipping tank is open at its top whereby material to be treated by dipping enters said dipping tank through its open top.

8. A dehydration system for removing water from materials, comprising a dipping tank filled with a dehydrating solution for dipping a material to be treated, cooling means for cooling said dehydrating solution to adjust its temperature, concentrating means for concentrating said dehydrating solution to adjust its concentration, and sterilizing means for sterilizing said dehydrating solution.

9. A dehydration system for removing water from materials as claimed in claim 8, wherein said cooling means includes a cooling device provided outside said dipping tank and circulating means for circulating said dehydrating solution in said dipping tank through said cooling device.

10. A dehydration system for removing water from materials, as claimed in claim 8, wherein said sterilizing means includes means for sterilizing said dehydrating solution to which said dehydrating solution is exposed.

11. A dehydration system for removing water from materials as claimed in claim 8, wherein said sterilizing means includes an ultraviolet ray irradiating device and an ozone supplying device.

12. A dehydration system for removing water from materials as claimed in claim 11, wherein said sterilizing means includes a sterilizing device provided outside said dipping tank and circulating means for circulating said dehydrating solution in said dipping tank through said sterilizing device.

13. A dehydration system for removing water from materials as claimed in claim 8, wherein said concentrating means includes a concentrating device provided outside said dipping tank and circulating means for circulating said dehydrating solution in said dipping tank through said concentrating device.

14. A dehydration system for removing water from materials as claimed in claim 13, wherein said concentrating device includes a heating device for heating said dehydrating solution and a vacuum concentrating device for concentrating under vacuum said dehydrating solution heated in said heating device.

15. A dehydration system for removing water from materials comprising a dipping tank filled with a dehydrating solution for dipping a material to be treated, cooling means for cooling said dehydrating solution to adjust its temperature, and concentrating means for concentrating said dehydrating solution to adjust its concentration,
wherein said concentrating means includes a concentrating device provided outside said dipping tank and a circulating means for circulating said dehydrating solution from said dipping tank through said concentrating device and back to said dipping tank, and
wherein said concentrating device further includes a heating device for heating said dehydrating solution and a vacuum concentrating device for concentrating under vacuum said dehydrating solution heated in said heating device.

16. A dehydration system for removing water from food comprising a dipping tank filled with a dehydrating solution for dipping a food to be treated, cooling means for cooling said dehydrating solution to adjust its temperature, and concentrating means for concentrating said dehydrating solution to adjust its concentration.

17. A dehydration system for removing water from food as claimed in claim 16, wherein said concentrating means includes a concentrating device provided outside said dipping tank and a circulating means for circulating said dehydrating solution from said dipping tank through said concentrating device and back to said dipping tank.

18. A dehydration system for removing water from food as claimed in claim 16, wherein said cooling means includes a cooling device provided outside said dipping tank and circulating means for circulating said dehydrating solution from said dipping tank through said cooling device and back to said dipping tank.

19. A dehydration system for removing water from food comprising a dipping tank filled with a dehydrating solution for dipping a food to be treated, cooling means for cooling said dehydrating solution to maintain its temperature, and concentrating means for concentrating said dehydrating solution to adjust its concentration.

20. A dehydration system for removing water from food, comprising a dipping tank filled with a dehydrating solution for dipping a food to be treated, cooling means for cooling said dehydrating solution to adjust its temperature, and concentrating means for concentrating said dehydrating solution to maintain its concentration.

21. A dehydration system for removing water from food comprising a dipping tank filled with a dehydrating solution for dipping a food to be treated, cooling means for cooling said dehydrating solution to maintain its temperature, and concentrating means for concentrating said dehydrating solution to maintain its concentration.

22. A dehydration system for removing water from materials, comprising a dipping tank filled with a dehydrating solution for dipping a material to be treated, cooling means for cooling said dehydrating solution to maintain its temperature, and concentrating means for concentrating said dehydrating solution to adjust its concentration.

23. A dehydration system for removing water from materials, comprising a dipping tank filled with a dehydrating solution for dipping a material to be treated, cooling means for cooling said dehydrating solution to adjust its temperature, and concentrating means for concentrating said dehydrating solution to maintain its concentration.

24. A dehydration system for removing water from materials, comprising a dipping tank filled with a dehydrating solution for dipping a material to be treated, cooling means for cooling said dehydrating solution to maintain its temperature, and concentrating means for concentrating said dehydrating solution to maintain its concentration.

* * * * *